United States Patent
Arnold, Jr. et al.

(10) Patent No.: US 9,863,634 B1
(45) Date of Patent: Jan. 9, 2018

(54) EXHAUST FLUE CAP AND FILTER DEVICE FOR A GAS FIRED APPLIANCE

(75) Inventors: John G. Arnold, Jr., Tulsa, OK (US); Joseph D. Smith, Owasso, OK (US)

(73) Assignee: European Copper, LLC, Tulsa, OK (US)

( * ) Notice: Subject to any disclaimer, the term of this patent is extended or adjusted under 35 U.S.C. 154(b) by 1489 days.

(21) Appl. No.: 13/093,561

(22) Filed: Apr. 25, 2011

Related U.S. Application Data

(63) Continuation-in-part of application No. 12/146,129, filed on Jun. 25, 2008.

(60) Provisional application No. 60/975,693, filed on Sep. 27, 2007.

(51) Int. Cl.
  *F23J 13/08* (2006.01)
  *F23L 17/02* (2006.01)

(52) U.S. Cl.
  CPC .................................. *F23L 17/02* (2013.01)

(58) Field of Classification Search
  CPC ............. F23L 17/02; F23L 17/10; F23J 13/08
  USPC ................... 454/1, 3, 4, 36, 37–38
  See application file for complete search history.

(56) References Cited

U.S. PATENT DOCUMENTS

| | | | |
|---|---|---|---|
| 218,643 A * | 8/1879 | Rumely | 55/307 |
| 2,777,382 A * | 1/1957 | Solzman | 454/341 |
| 2,803,184 A | 8/1957 | Wasserman | |
| 3,361,051 A | 1/1968 | Fair et al. | |
| 3,404,619 A * | 10/1968 | Topp | 454/367 |
| 3,441,381 A | 4/1969 | Keith et al. | |
| 3,885,977 A | 5/1975 | Lachman et al. | |
| 4,147,096 A | 4/1979 | Caswell | |
| 4,279,629 A * | 7/1981 | Simms | 55/307 |
| 4,397,225 A | 8/1983 | Patton | |
| 4,399,743 A | 8/1983 | Izzi, Sr. | |
| 4,593,504 A | 6/1986 | Bonnici et al. | |
| 4,889,160 A | 12/1989 | Sheets | |
| 5,749,780 A | 5/1998 | Harder et al. | |
| 6,022,269 A | 2/2000 | Arbucci | |
| 6,805,627 B2 | 10/2004 | Marts et al. | |
| D503,471 S | 3/2005 | Huta | |
| 6,926,600 B1 | 8/2005 | Arnold, Jr. | |
| 6,978,803 B2 | 12/2005 | Brown et al. | |
| D535,010 S | 1/2007 | Arnold, Jr. | |
| 7,179,164 B2 | 2/2007 | Arnold, Jr. | |
| D574,944 S | 8/2008 | Arnold, Jr. | |

(Continued)

FOREIGN PATENT DOCUMENTS

| | | |
|---|---|---|
| DE | 2057449 | 6/1972 |
| DE | 2220023 | 11/1973 |

(Continued)

*Primary Examiner* — Helena Kosanovic
(74) *Attorney, Agent, or Firm* — Head, Johnson, Kachigian & Wilkinson, PC

(57) ABSTRACT

An exhaust flue cap and filter device for a gas fired appliance in communication with an exhaust flue opening. The device includes an inner collar to engage the exhaust flue opening. A tubular cap with a closed lower end is in communication with the inner collar. A filter tray is suspended in the tubular cap wherein the filter tray has a smaller diameter than the tubular cap so that a bypass space is formed between the filter tray and the tubular cap to permit passage of exhaust gases. A removable filter insert is receivable in the filter tray. A removable top having a body with exhaust openings is attached to and closes the open upper end of the tubular cap.

12 Claims, 4 Drawing Sheets

(56) References Cited

U.S. PATENT DOCUMENTS

| | | |
|---|---|---|
| D583,458 S | 12/2008 | Arnold, Jr. |
| D584,395 S | 1/2009 | Arnold, Jr. |
| D592,298 S | 5/2009 | Arnold, Jr. |
| D593,671 S | 6/2009 | Arnold, Jr. |
| D605,749 S | 12/2009 | Arnold, Jr. |
| D619,237 S | 7/2010 | Arnold, Jr. |
| 2002/0104528 A1 | 8/2002 | Staller |

FOREIGN PATENT DOCUMENTS

| | | | |
|---|---|---|---|
| DE | 8405331 | | 5/1984 |
| DE | 4209225 | | 9/1993 |
| EP | 0322570 | | 7/1989 |
| FR | 716368 A | * | 4/1931 |
| FR | 1340447 | | 10/1963 |
| JP | 60155822 | | 8/1985 |
| WO | 2006110505 | | 10/2006 |

* cited by examiner

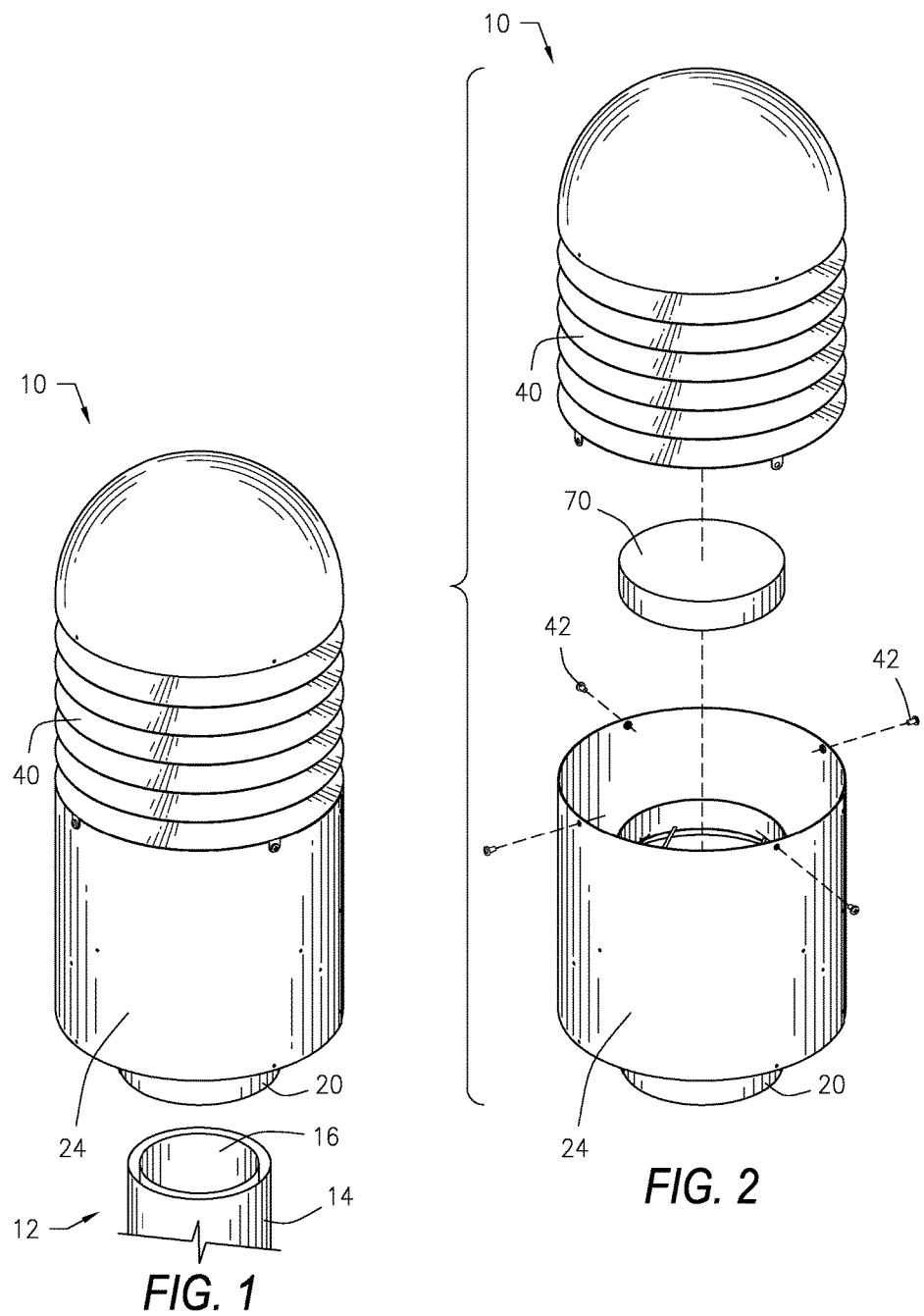

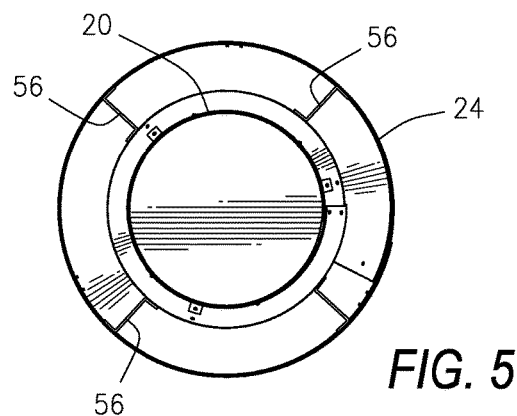
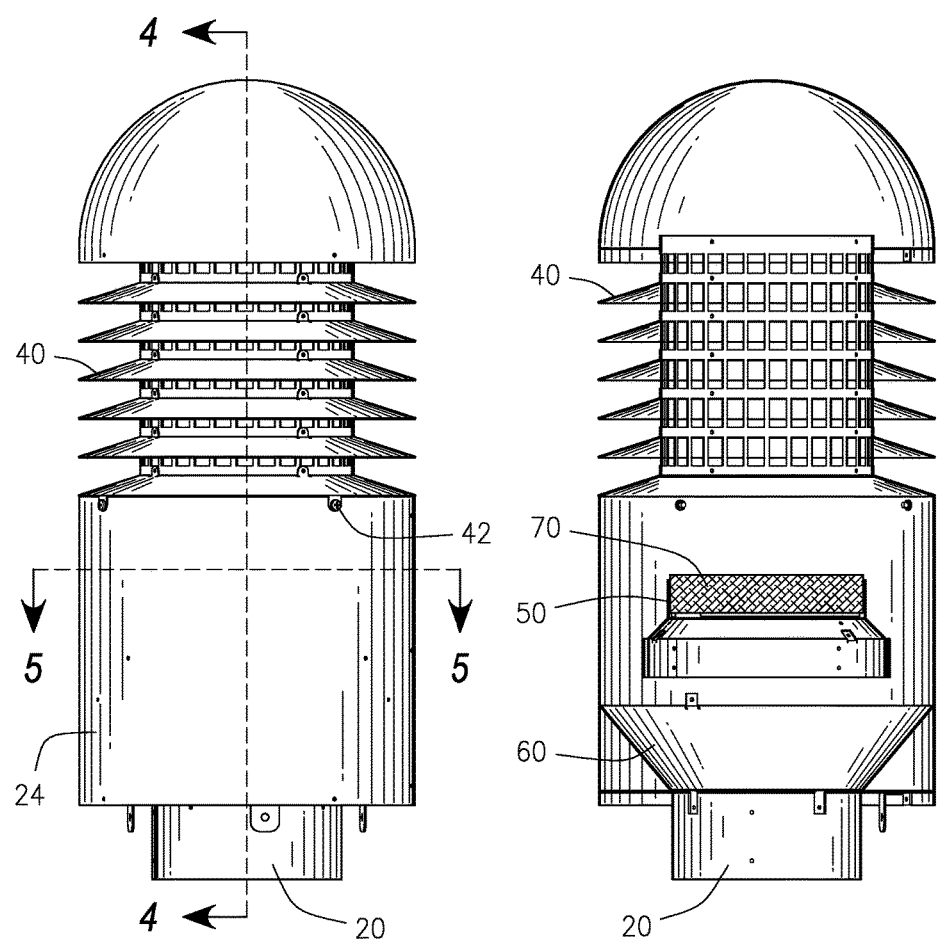
FIG. 5
FIG. 3
FIG. 4

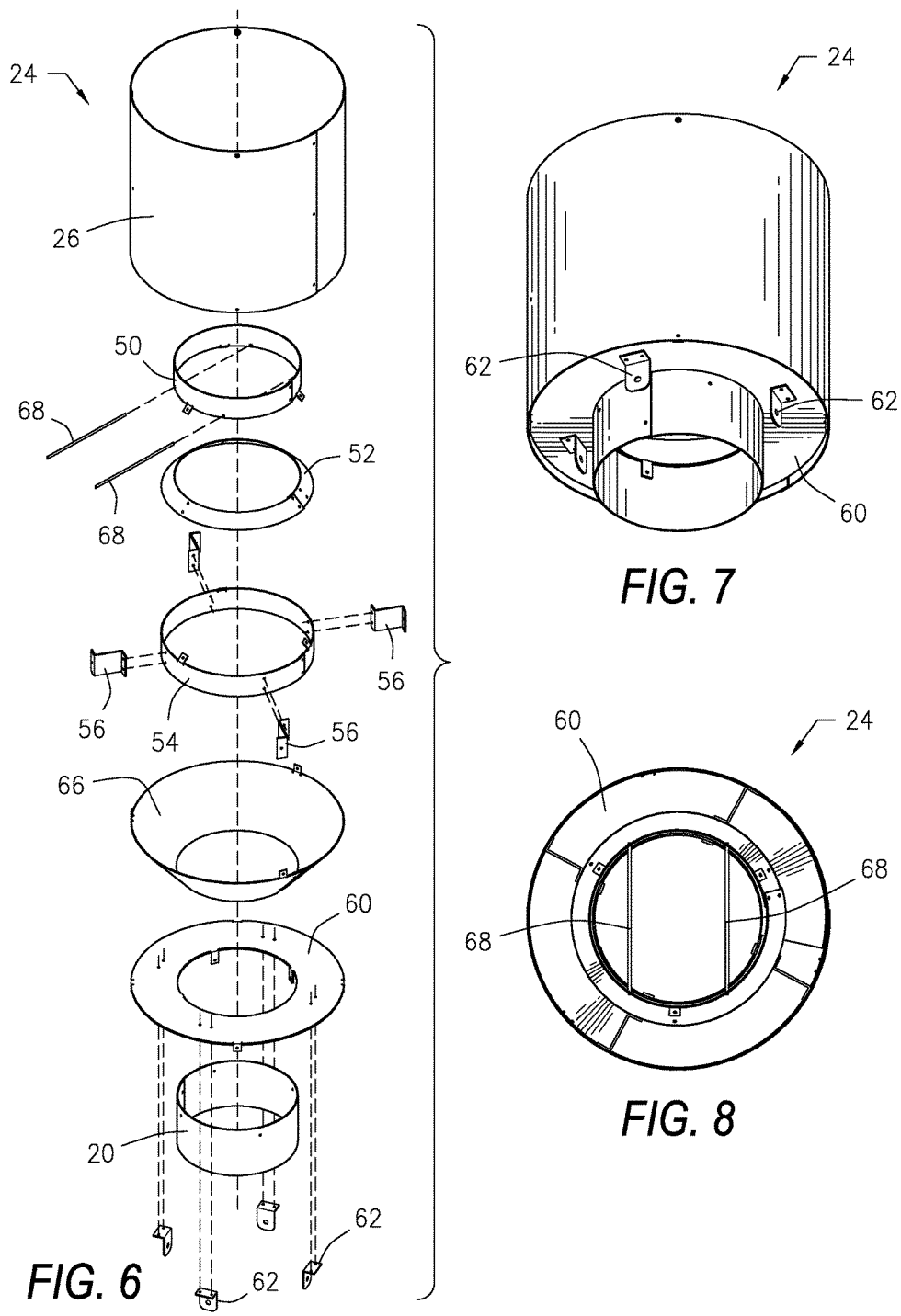

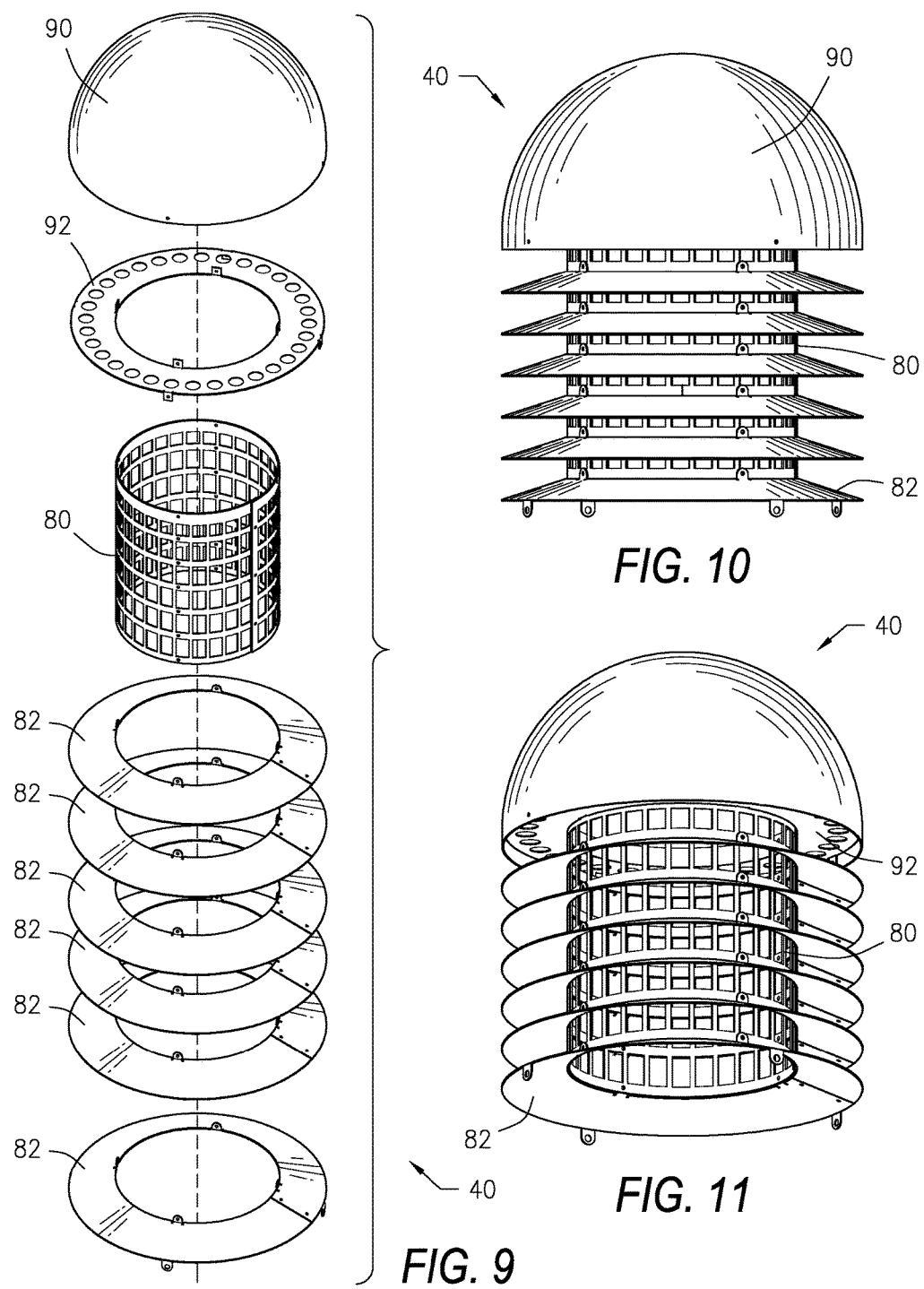

EXHAUST FLUE CAP AND FILTER DEVICE FOR A GAS FIRED APPLIANCE

CROSS-REFERENCE TO PENDING APPLICATIONS

This application is a Continuation-in-Part Application based on and entitled to the filing date of U.S. patent application Ser. No. 12/146,129 filed Jun. 25, 2008, which claims priority to U.S. Provisional Patent Application Ser. No. 60/975,693 filed Sep. 27, 2007.

BACKGROUND OF THE INVENTION

1. Field of the Invention

The present invention is directed to an exhaust flue cap and filter device and a method for use of an exhaust flue cap and filter device for a gas fired appliance. In particular, the present invention is directed to an exhaust flue cap and filter device which will efficiently vent exhaust gases while reducing carbon monoxide in particulate emissions from the exhaust of a gas fired appliance.

2. Prior Art

There are various types of known gas fired appliances that are used with buildings and residences. These include gas fired water heaters, gas fired boilers, gas fired fireplaces, gas logs fitted within fireplaces, gas fired air heating systems, gas fired clothes dryers, or other apparatus that use gaseous hydrocarbon fuels, such as but not limited to natural gas or propane.

For the most part, gas fired appliances are relatively efficient and do not produce the extensive amount of soot or other emissions associated with wood burning fireplaces and stoves or with coal burning fireplaces or stoves. Even gas fired appliances, however, produce a certain amount of particulate emissions and carbon monoxide emissions.

It is advisable and required by laws, codes, or regulations in many applications in many jurisdictions to vent exhaust from a gas fired appliance from the building or residence outside to the atmosphere. There are various types and configurations of known exhaust venting systems. One type of double wall flue exhaust is known as a Type B double wall gas vent system. A Type B vent system includes an outer cylindrical wall along with a coaxial and concentric inner liner spaced from the outer wall.

Accordingly, the present invention is directed to an exhaust flue cap and filter device capable of reducing carbon monoxide and particulate emissions from the exhaust of gas fired appliances.

The present invention is also directed to an exhaust flue cap and filter device for a gas fired appliance that can be installed with new building or new residence construction or can be retro-fit to an existing flue opening of a building or residence.

The present invention is also directed to an exhaust flue cap and filter device for a gas fired appliance that reduces carbon monoxide and particulate emissions through a removable and replaceable catalytic filter insert.

The present invention is also directed to an exhaust flue cap and filter device that will reduce carbon monoxide and particulate emissions without restricting the flow through the flue cap.

The present invention is also directed to an exhaust flue cap and filter device that permits bypass of exhaust gases in the event of any blockage or malfunction of the filter component of the device.

The present invention is also directed to an exhaust flue cap and filter device that will avoid positive pressure buildup within the device while preventing backflow into the device from the wind.

The present invention is also directed to an exhaust flue cap and filter device that protects the components therein from the elements and from birds or small animals.

SUMMARY OF THE INVENTION

The present invention is directed to an exhaust flue cap and filter device which may be utilized with various types and configurations of exhaust flue openings including a double wall exhaust system, such as a Type B double wall gas vent system.

The exhaust flue cap and filter device includes an inner collar which engages the exhaust flue opening. A tubular cap assembly includes a substantially enclosed lower end which is in communication with the inner collar so that exhaust gases passing from the exhaust flue opening into the inner collar will pass directly into the tubular cap assembly.

A filter tray suspended within the tubular cap has a smaller diameter then the tubular cap. The filter tray has an open bottom and an open top. Extending from the open bottom of the filter tray is an extending flare skirt which tends to draw in exhaust gases. The skirt is attached to the inner wall of the tubular cap by a plurality of brackets. Accordingly, the filter tray and the skirt are suspended within the tubular cap but form a bypass space between the filter tray and the skirt to permit exhaust gases to pass through the tubular cap assembly.

The filter tray supports and holds a removable filter insert which may be removed and cleaned or may be replaced.

A removable top is attached to and closes an open upper end of the tubular cap. The removable top includes a body having a plurality of exhaust openings. Extending radially outward from the body are a plurality of angled louvers. The removable top may also optionally include a spherical dome having a larger diameter than the body of the removable top.

BRIEF DESCRIPTION OF THE DRAWINGS

FIG. 1 is a perspective view of an exhaust flue cap and filter device constructed in accordance with the present invention;

FIG. 2 is an exploded view, perspective view of the exhaust flue cap and filter device shown in FIG. 1 apart from the exhaust flue opening;

FIG. 3 illustrates a side view of the exhaust flue cap and filter device shown in FIG. 1 apart from the exhaust flue opening;

FIG. 4 illustrates a sectional view taken along section lines 4-4 of FIG. 3;

FIG. 5 illustrates a sectional view taken along section lines 5-5 of FIG. 3;

FIG. 6 illustrates an exploded view of the tubular cap assembly of the exhaust flue cap and filter device shown in FIG. 1;

FIG. 7 illustrates a perspective view of the tubular cap assembly while FIG. 8 illustrates the bottom view of the tubular cap assembly;

FIG. 9 illustrates an exploded view of the removable cap of the exhaust flue cap and filter device of the present invention; and FIG. 10 illustrates a side view of the removable top while FIG. 11 illustrates a perspective view of the removable top.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Referring to the drawings in detail, FIG. 1 illustrates a perspective view of an exhaust flue cap and filter device 10 shown spaced from and apart from an exhaust flue opening 12. FIG. 2 illustrates an exploded, perspective view of the exhaust flue cap and filter device 10 apart from the exhaust flue opening.

The present invention operates with exhaust flue openings of various types and various configurations. As seen in FIG. 1, in one non-limiting embodiment, the exhaust flue device 10 of the present invention may be utilized with a double wall exhaust system, such a Type B double wall gas vent system, which includes an outer cylindrical pipe 14 and a coaxial and concentric cylindrical liner 16 having a diameter smaller than the outer cylindrical pipe 14. The exhaust flue opening 12 may extend outward from a wall or roof of a building or residence (not shown).

The exhaust flue cap and filter device 10 includes an inner collar 20 which engages the exhaust flue opening 12. The inner collar 20 will engage the cylindrical liner 16 and may be attached by fasteners. In the present preferred embodiment, the inner collar 20 is cylindrical and concentric with the exhaust flue opening 12. The inner collar 20 may be fabricated from flat sheet metal or other lightweight, durable material.

The exhaust flue cap and filter device 10 includes a tubular cap assembly 24 with a substantially closed lower end. The lower end is in communication with the inner collar 20 so that exhaust gas passing from the exhaust flue opening 12 into the inner collar 20 will be passed directly into the tubular cap assembly 24. The tubular cap assembly 24 also includes an opposed open upper end.

The tubular cap assembly 24 includes a tube 26 which may be configured so that a cross-section is in the form of a circle, an octagon, a hexagon, a square, a rectangle, an oval, or other configuration. The tubular cap assembly 24 may be fabricated from flat sheet metal or other lightweight, durable material.

A removable top 40 is attached to and closes the open upper end of the tubular cap assembly 24. The removable top 40 may be secured to the open upper end of the tubular cap assembly 24 by fasteners 42 or other mechanism. The removable top 40 may likewise be fabricated from flat sheet metal or other lightweight durable metal.

FIG. 3 illustrates a side view of the exhaust flue cap and filter device 10 apart from the exhaust flue opening 12.

FIG. 4 illustrates a sectional view taken along section line 4-4 of FIG. 3 while FIG. 5 illustrates a sectional view taken along section line 5-5 of FIG. 3.

FIG. 6 illustrates an exploded view of the tubular cap assembly 24 for ease of viewing apart from the device 10 while FIG. 7 illustrates a perspective view of the tubular cap assembly and FIG. 8 illustrates a bottom view of the tubular cap assembly. FIGS. 6, 7 and 8 illustrate the tubular cap assembly 24 apart from the rest of the device 10.

A filter tray 50 is suspended within the tubular cap 24 and has a smaller diameter than the tubular cap 24.

The filter tray 50 has an open bottom and an open top. Extending from the bottom of the filter tray is an optional extending flared skirt having elements 52 and 54. The skirt 52 and 54 extends downward from the filter tray 50. The skirt has a larger diameter than the filter tray 50 but a smaller diameter than the tubular cap 24. Accordingly, the skirt 52 and 54 will tend to draw in exhaust gases passing from the exhaust flue opening 12 into the tubular cap 24.

Element 54 of the skirt is attached to the inner wall of the tubular cap 24 by a plurality of brackets 56. Accordingly, the filter tray 24 and the skirt 54 are suspended within the tubular cap 24 but form a bypass space between the filter tray 50 and skirt 52 and 54 in order to permit exhaust gasses to pass through the tubular cap 24.

As best seen in FIGS. 6, 7 and 8, a bottom plate 60 extends between the inner collar 20 and the tube 26 to form the closed bottom of the tubular cap 24. A plurality of brackets 62 extend outward from the bottom plate 60 to secure the device to the exhaust flue opening 12. Other types of fastening mechanisms are possible within the spirit and scope of the present invention.

As visible in FIGS. 4 and 6, an optional frusto conical guide 66 extends within the tubular cap 24 from the bottom plate 60. The frusto conical guide 66 acts to minimize turbulence of exhaust gases passing from the exhaust flue opening into the inner collar 20 into the tubular cap 24.

As best seen in FIG. 6, the filter tray 50 includes a support or supports 68 which pass across the filter tray 50. The filter tray 50 and the supports 68 act together to support and hold a removable filter insert 70, as seen in FIGS. 2 and 4. In one configuration, the filter insert 70 is substantially cylindrical with a slightly smaller diameter than the filter tray 50 so that the filter insert 70 is received into and supported by the filter tray 50.

It will be appreciated that the filter tray 50 may have a circular, square or other cross section (smaller than the tubular cap 24) in order to accommodate a filter insert 70 in a similar shape. Because the filter insert 70, the filter tray 50 and the skirt 52 and 54 each have a diameter less than the diameter of the tubular cap 24, gases are permitted to enter the base of the tubular cap 24 from the inner collar 20 and pass outside and around the filter tray 50 and filter insert 70. In the event of blockage or malfunction of the filter insert for any reason, exhaust and other gases may pass through the tubular cap 24 and through the device 10 without any blockage.

The filter insert 70 may be removed and cleaned or may be replaced by removing the fasteners 42 in order to remove the removable top 40 from the tubular cap 24. Thereafter, it will be possible to easily access the filter insert 70 in order to remove it from the filter tray 50. The existing filter insert may be cleaned or a replacement filter insert may be installed in the filter tray 50 suspended in the tubular cap 24. Thereafter, the removable top 40 may be reattached to the tubular cap by the fasteners 42.

The filter insert 70 may be fabricated from a number of materials in order to reduce carbon monoxide and particulate emissions from the exhaust of the gas fired appliance.

In one configuration, the filter insert 70 may be catalytically active in order to reduce carbon monoxide (CO) which escapes from the device 10. The catalytically active filter insert 70 may include a core or substrate and a washcoat including catalytically active metals. The filter insert reduces unburned hydrocarbons and carbon monoxide by oxidizing them over a metal catalyst. This catalyst aids the reaction of the carbon monoxide (CO) and hydrocarbons with the remaining oxygen in the exhaust gas and with oxygen in the atmospheric air entering the tubular cap 24. For example:

$$2CO + O_2 \Longrightarrow 2CO_2$$

The catalytically active converter may include a core or substrate material and a washcoat which is comprised of catalytically active metals. The washcoat is applied to the surface of the core or substrate material so that the washcoat comes into contact with exhaust gases passing from the gas fired appliance through the device 10.

The removable filter insert 70 may be comprised of a number of materials. In a first preferred configuration, the filter insert 70 may be a wire screen or a series of wire screens with a washcoat including a precious metal catalyst. In one non-limiting example, the wire screen may have eighth inch (⅛") square openings.

In a second embodiment, the filter insert 70 may be comprised of a ceramic block monolith having a honeycomb structure with gas flow passages which are coated with a washcoat having a precious metal catalyst.

In a third embodiment, the filter insert 70 is comprised of a metal foam with between three to five pores per square inch. The filter insert includes a washcoat having a precious metal catalyst.

In a fourth configuration, the filter insert may take the form of multiple ceramic discs which are coated with a washcoat having a precious metal catalyst. In each case, the washcoat may be alumina based.

FIG. 9 illustrates an exploded view of the removable top 40 apart from the exhaust flue cap and filter device 10. FIG. 10 illustrates a side view of the removable top 40 while FIG. 11 illustrates a perspective view of the removable top 40 apart from the device 10.

The removable top 40 includes a body 80 having a plurality of slotted exhaust openings. The body 80 may have cross-section in the form of a circle or other configuration. The body 80 is coaxial with the tubular cap 24 previously described. Extending radially outward from the body 80 are a plurality of angled louvers 82. The angled louvers 82 are spaced from each other and may be attached to the body 80 by fasteners. The lower most louver 82 may be fastened to the open upper end of the tubular cap 24 by fasteners 42.

The louvers 82 are angled to aerodynamically enhance the exhaust. By having the louvers 82 recessed from the larger external diameter of the tubular cap, it has been found that there is less problem with back drafts or crosswinds.

The removable top 40 may also include a spherical dome 90. The spherical dome 90 optionally has a larger diameter than the body 80 of the removable top 40. The spherical dome 90 discourages rain from passing through the body of the removable top.

Extending between the removable top 40 and the body 80 is a flange plate 92 with a plurality of openings visible in FIGS. 9 and 11. Exhaust gases that pass into the spherical dome 90 can be vented through the flange plate openings. Additionally, any condensation or other materials within the spherical dome are permitted to exit through the flange plate openings.

In use, exhaust gases are passed from a gas fired appliance (not shown) through the exhaust vent system flue opening 12 into the inner collar and then to the tubular cap 24. The exhaust gases pass into and through the catalytic filter insert 70 in the filter tray. The exhaust gases are treated by the catalytically active filter insert 70 which promotes oxidation in order to convert excess carbon monoxide (CO) into carbon dioxide ($CO_2$). The treated gases are thereafter permitted to move from the upper end of the tubular cap 24 into the removable top 40 and then out to the atmosphere.

A further objective of the present invention is to eliminate pressure buildup through the device 10 by not restricting the flow through the device of the bypass design. The design of the device avoid positive pressure buildup within the device while preventing back flow from wind. In testing of the exhaust flue cap and filter device 10 of the present invention, only a minimal pressure drop was observed as exhaust gases passed from the vent flue exhaust through the device 10.

Testing of the exhaust flue cap and filter device 10 of the present invention revealed a reduction of carbon monoxide emissions of from 20-40% but as high as 70% depending on operating conditions.

Whereas, the present invention has been described in relation to the drawings attached hereto, it should be understood that other and further modifications, apart from those shown or suggested herein, may be made within the spirit and scope of this invention.

What is claimed is:

1. An exhaust flue cap and filter device for a gas fired appliance in communication with an exhaust flue opening, which device comprises:

an inner collar to engage said exhaust flue opening;

a tubular cap having a bottom plate extending between said tubular cap and said inner collar and extending substantially perpendicular to said inner collar to form a closed end between said tubular cap and said inner collar, said cap in fluid communication with said inner collar and having an opposed open upper end;

a removable filter insert receivable in a filter tray, said filter tray suspended within said tubular cap, wherein said filter tray has a smaller diameter than said tubular cap so that a bypass space is formed between said filter in said filter tray and said tubular cap to permit passage of exhaust gases such that said exhaust gases bypass the filter in said filter tray;

a frustoconical skirt extending downward from said filter tray such that the skirt is located entirely below the filter insert to draw in exhaust gases, said frustoconical skirt increasing in diameter as it extends downward from said filter tray; and a removable top having a body with exhaust openings attached to and closing said open upper end of said tubular cap, wherein said body has a plurality of vertically spaced angled louvers extending radially therefrom such that each louver surrounds the body a frusto-conical guide extending from said bottom plate within said tubular cap to minimize turbulence of exhaust gases.

2. An exhaust flue cap and filter device as set forth in claim 1 wherein said exhaust flue opening includes an outer pipe and a coaxial liner, and said inner collar engages said coaxial liner.

3. An exhaust flue cap and filter device as set forth in claim 2 wherein said inner collar is attached to said coaxial liner by fasteners.

4. An exhaust flue cap and filter device as set forth in claim 1 wherein said removable top includes a spherical dome.

5. An exhaust flue cap and filter device as set forth in claim 4 wherein said spherical dome has a larger diameter than said body of said removable top and a flange plate with exhaust openings extends between said spherical dome and said removable top.

6. An exhaust flue cap and filter device as set forth in claim 1 wherein said tubular cap has a cross section chosen from the group consisting of an octagon, a hexagon, a square, a rectangle, an oval, and a circle.

7. An exhaust flue cap and filter device as set forth in claim 1 wherein said filter insert is a catalytically active converter having catalytically active metals.

8. An exhaust flue cap and filter device as set forth in claim 1 wherein said filter ray is suspended within said tubular cap by a plurality of brackets.

9. A process to exhaust and filter exhaust gases from a gas fired appliance, which process comprises:
   directing exhaust gases from an exhaust flue opening into an inner collar of a flue cap and filter device;
   passing said exhaust gases from said inner collar into a tubular cap having a bottom plate extending between said tubular cap and said inner collar and extending substantially perpendicular to said inner collar to form a closed end between said tubular cap and said inner collar, said cap in fluid communication with said inner collar;
   passing at least a portion of said exhaust gases to a frustoconical skirt extending downward from a filter tray suspended in said tubular cap wherein the filter tray holds a filter insert and has a smaller diameter than the tubular cap so that a bypass space is formed between the said filter in said filter tray such that said exhaust gases bypass the filter in said filter tray and said tubular cap, wherein the skirt is located entirely below the filter insert and wherein said frustoconical skirt increases in diameter as it extends downward from said filter tray;
   permitting passage of exhaust gases through said bypass space;
   directing said exhaust gases from said tubular cap into a removable top having a body with exhaust openings, where said body has a plurality of vertically spaced angled louvers extending radially therefrom such that each louver surrounds the body; and
   permitting said exhaust gases to pass from said removable top through said exhaust openings guiding the exhaust gases from said inner collar through a frusto-conical guide that extends from said bottom plate within said tubular cap to minimize turbulence of exhaust gases.

10. A process to exhaust and filter exhaust gases from a gas fired appliance as set forth in claim 9 including the step of passing at least a portion of said exhaust gases through the filter insert in said filter tray.

11. A process to exhaust and filter exhaust gases from a gas fired appliance as set forth in claim 10 including the step of permitting passage of all of said exhaust gases through said bypass space if said filter insert is clogged.

12. A process to exhaust and filter exhaust gases from a gas fired appliance as set forth in claim 10 wherein said filter insert is a catalytically active converter having catalytically active metals and including the additional step of reducing unburned hydrocarbons and carbon monoxide by oxidizing them over the catalytically active metals.

\* \* \* \* \*